United States Patent [19]

Sudan et al.

[11] 4,219,623

[45] Aug. 26, 1980

[54] PHENOL FORMALDEHYDE RESIN FOAMS

[75] Inventors: Krishan K. Sudan, Laval; Antoine Berchem, St. Hippolyte, both of Canada

[73] Assignee: Reichhold Limited, Islington, Canada

[21] Appl. No.: 919,972

[22] Filed: Jun. 28, 1978

[30] Foreign Application Priority Data

Jul. 26, 1977 [GB] United Kingdom ............... 31332/77
Dec. 12, 1977 [GB] United Kingdom ............... 51631/77

[51] Int. Cl.² ................. C08J 9/04; C08G 65/38
[52] U.S. Cl. ............................ 521/85; 521/109; 521/128; 521/130; 521/136; 521/181
[58] Field of Search ........... 521/181, 85, 109, 130, 521/128, 136

[56] References Cited

U.S. PATENT DOCUMENTS

| | | | |
|---|---|---|---|
| 2,629,698 | 2/1953 | Sterling | 521/109 |
| 2,653,139 | 9/1953 | Sterling | 521/181 |
| 3,298,973 | 1/1967 | Quarles et al. | 521/181 |
| 3,389,094 | 6/1968 | D'Alessandro | 521/181 |
| 3,484,391 | 12/1969 | Wheatley et al. | 521/130 |
| 3,740,358 | 6/1973 | Christie et al. | 521/181 |
| 3,870,661 | 3/1975 | Crook et al. | 521/130 |
| 3,907,723 | 9/1975 | Pretot | 521/181 |
| 3,915,905 | 10/1975 | Hanton | 521/181 |
| 3,953,645 | 4/1976 | Moss | 521/181 |
| 4,107,107 | 8/1978 | Mendelsohn et al. | 521/181 |
| 4,111,911 | 9/1978 | Weissenfels et al. | 521/181 |
| 4,122,045 | 10/1978 | Garrett et al. | 521/181 |
| 4,176,106 | 11/1979 | Reid et al. | 521/181 |
| 4,176,216 | 11/1979 | Reid et al. | 521/181 |

*Primary Examiner*—H. S. Cockeram
*Attorney, Agent, or Firm*—Larson, Taylor and Hinds

[57] ABSTRACT

A two component system, and method for its preparation, from which a phenol-formaldehyde resin foam may be prepared, which system comprises in a first component a phenol-formaldehyde resin, a blowing agent which is an inert, low boiling liquid, an effective amount of a nitrogenous modifier capable of permitting dispersion of the blowing agent in the resin, and a surfactant; and in a second component an acid catalyst system dispersed in a liquid polyhydroxy compound, in a weight ratio of acid catalyst to polyhydroxy compound of at least 1:1. These systems enable simpler handling and placement techniques being shelf storable, compared to the known shelf storable systems which involve three, or more, components.

29 Claims, No Drawings

PHENOL FORMALDEHYDE RESIN FOAMS

BACKGROUND OF THE INVENTION

This invention relates to phenol-formaldehyde resin foam systems. More particularly, it relates to a method of obtaining a phenolformaldehyde foam system which requires the admixture together of only two components.

The major use of this foam system is as an insulating material in building construction due to its low flammability and good insulation properties.

Most foam systems, of which polyurethanes are perhaps the best known, are obtained by cross linking a polymer by means of a catalyst, in the presence of a blowing agent. It is the blowing agent which forms the gas which causes the system to foam. This gas can be generated in several ways. It can be obtained chemically, but the most used method, perhaps because it is inherently the simplest, is to incorporate into the foam system a low boiling compound which is liquid under normal storage conditions for the foam components, which does not interfere with the cross linking reaction, but which vapourizes under the influence of heat generated in that cross linking reaction. It is also necessary that the foaming agent be dispersible, preferably soluble, in one of the components used to make the foam. The commonly used blowing agents are low boiling hydrocarbons such as butane and pentane, or chlorofluoro hydrocarbons, such as dichlorodifluoromethane.

Thus, it is apparent that the basic needs which must be met to get a good foam are proper cross linkable resin, a catalyst capable of cross linking that resin, and a blowing agent. It is also apparent that to prepare foam, one simply has to mix together these three reagents, together with desired surfactant, inert dyes, fillers, plasticizers and so forth.

The difficulty that this invention seeks to solve in relation to phenol-formaldehyde foam is that this simple picture bears only a limited similarity to reality. Clearly it is most convenient for the user to be able to prepare a foam by taking the requisite amounts of two components out of their containers, mixing thoroughly, and waiting. For many of the industrially used systems, particularly the urethane systems, this is the situation. But where phenol-formaldehyde systems are concerned, it is not that simple case. The difficulty that has been encountered with phenol-formaldehyde systems has been that it has not been possible hitherto to produce a stable, storable material capable of packaging in simple containers with an adequate shelf life which contains in only two components the three major requirements of catalyst, phenol-formaldehyde resin, and blowing agent.

SUMMARY OF THE INVENTION

We have now discovered that provided certain requirements are met, a two component system, which is a stable, storable material with an adequate shelf life, can be produced, containing the phenol-formaldehyde resin and blowing agent in one component, and the acid catalyst in the other. These components, on mixing, produce an acceptable crosslinked phenol-formaldehyde resin foam. Thus, we have discovered one route whereby the blowing agent may be incorporated into the phenol-formaldehyde resin component and yet still produce a stable, storable system with an adequate shelf life.

Thus, in a broad aspect, this invention comprises a two component system from which a phenol-formaldehyde resin foam can be prepared, which system comprises, in a first component, a phenolic resin, a blowing agent which is an inert low boiling liquid, an effective amount of a modifier capable of permitting dispersion of the blowing agent in the resin, and a surfactant; and in a second component, an acid catalyst system dispersed in a polyhydroxy compound.

DETAILED DESCRIPTION OF THE INVENTION

In a first narrower aspect, this invention comprises a two component system from which a phenolic foam can be prepared, the components of which system are stable and have an adequate shelf life, in which a first component comprises:

1.
   (a) a phenol-formaldehyde resin
   (b) an inert blowing agent
   (c) a surfactant
   (d) an amine, or a polymeric amine, or a natural vegetable oil, containing amine or amino nitrogen;

and a second component which comprises:

2.
   (a) an acid catalyst system containing a mineral acid, or an organic acid together with one or more acids or their acidic salts.
   (b) a polyhydroxy compound chosen from ethylene glycol, propylene glycol, or glycerine.

In a second broad aspect, this invention comprises a method of making a phenolic foam by mixing together the two component system specified above in the desired ratio.

The preparation of some suitable phenol-formaldehyde resins is described in our Canadian Patent No. 927,041. The molar ratio of phenol to formaldehyde used is generally 1.0:1.0 to 1.0:2.0; a preferred range is 1.0:1.3 to 1.0:1.6. The resin as produced generally has a pH of 4.0 to 6.0. The resins with a pH of 4.5 to 6.0 appear to have enhanced shelf life.

The common phenol-formaldehyde resins catalysed by a mildly acidic salt and/or a base are also quite suitable to prepare a two component system being compatible with the other factors employed. The amine component of the foam system can itself be employed to prepare the resin which stays later a part of the system.

The following examples will illustrate the procedures of preparing various phenol-formaldehyde resins:

(A) 1092 grams of 44% aqueous solution of formaldehyde was loaded in a glass reactor equipped with suitable means of agitation, vapour condenser and vacuum distillation. The formaldehyde solution was adjusted to pH 8.0–8.4 with 10% solution of sodium hydroxide. Now 940 grams of phenol were added. The batch temperature was carefully raised to atmospheric reflux at 99°–101° C. over 30–40 minutes. The batch was held at atmospheric reflux until a cloud point (cool 5 ml. of batch sample in a test tube until a turbidity or a cloud is visible) of 50°–55° C. was achieved. At this stage, the batch was vacuum distilled to a Gardner-Holdt viscosity of V-W, and cooled. The final pH of the resin was 7.4.

(B) 955 grams of 44% formaldehyde solution was loaded in a reactor as described in Example (A), followed by 940 grams of phenol and 18.8 grams of zinc acetate. The batch was held at atmospheric reflux until a cloud point of 75°–80° C. was achieved. At this stage the batch was vacuum distilled to a Gardner-Holdt viscosity of V-W and cooled. The final pH of the resin was 5.1.

(C) 1024 grams of 44% formaldehyde solution was loaded in a reactor as described in Example (A), followed by 940 grams of phenol and 37.6 grams of triethanolamine. The batch was held at atmospheric reflux for a cloud point of 65°–70° C. and then vacuum distilled to a Gardner-Holdt viscosity of V-W. The final pH of the batch was 7.6.

(D) 1382.5 grams of 44% formaldehyde solution was loaded in a reactor, as described in Example (A), followed by 47 grams of triethanolamine and 77.5 grams of urea. The batch was slowly heated to atmospheric reflux and held at atmospheric reflux for 10 minutes. The batch was cooled to 85°–90° C. and 1175 grams of phenol were loaded. The batch was heated again to atmospheric reflux and held at atmospheric reflux until a cloud point of 45°–50° C. was achieved. At this stage, the batch was vacuum distilled to Gardner-Holdt viscosity of V-W and cooled. The final pH of the batch was 7.4.

(E) 1182 grams of 44% formaldehyde solution was loaded in a reactor, as described in Example (A), followed by 32 grams of triethanolamine and 109 grams of melamine. The batch was heated to atmospheric reflux and held for 10 minutes. The batch is cooled to 85°–90° C. and 1005 grams of phenol was loaded. The batch was heated back to atmospheric reflux and held at atmospheric reflux for a cloud point of 25°–30° C. At this cloud point, the batch was vacuum distilled to a Gardner-Holdt viscosity of V-W. The final pH of the batch was 7.4.

(F) 1365 grams of 44% formaldehyde solution was adjusted with triethanolamine to pH 7.6–7.8 and added slowly to 600 grams of urea in a reactor. The batch was heated slowly to 93°–95° C. and held for a cloud point of 40°–45° C. At the cloud point, the pH of the batch was brought down in the acid stage to pH 5.0–5.2 with dilute formic acid solution. The batch was held at 90°–95° C. and pH 5.0–5.2 until a Gardner-Holdt viscosity of B-C. Immediately, the pH was raised to 7.0–7.2 with triethanolamine. Another 300 grams of urea was added to the batch and the batch was vacuum distilled to a Gardner-Holdt viscosity of L-M. The final pH of the batch was 7.4.

The above examples (A), (B), and (C) illustrate a common phenol-formaldehyde resin suitable for the phenolic foam system of this invention. The examples (D) and (E) illustrate also a phenol-formaldehyde resin which is modified with amino resin co-condensed in one step. The example (F) respresents a typical urea-formaldehyde amino resin representing an amino resin which can be used to modify the phenol-formaldehyde resin for the foam system. All the above resin systems represent a non-volatile content of approximately 70% on weight basis.

The term "phenol" can include not only substantially pure phenol, but also technical grade phenols, and cresols with a high meta-and para-cresol content. A preferred phenol composition is one with a boiling range of 180°–200° C., containing not more than 15% by weight of ortho-cresol plus xylenols.

The formaldehyde generally is substantially pure, and derives from any of the industrially available sources, such as formalin, para-formaldehyde, etc.

The blowing agent used is an inert, low boiling compound which vaporises under the influence of the heat generated in the cross linking reaction. Generally, this will involve temperatures less than 100° C. The preferred blowing agent is dichlorodifluoromethane.

The surfactant can be anionic, cationic, or nonionic. The only restriction of any significance is the obvious one that it must not interfere with the foaming and cross linking processes. A suitable preferred one is a silicone based material, for example Dow Corning 190 (Trade Mark).

The modifier whereby the four essential parts of the resin component are rendered homogeneous is generally an amino, or nitrogeneous compound. The precise nature of this compound will depend, in large part, upon the purpose to which the foam is to be put: this facet of this invention is discussed further, below. Typical materials which have been found to work include comparatively low vapor pressure amines such as diethanolamine; triethanolamine; diethanoltriamine; triethanoltetramine; piperazine, and hexamethylene tetramine; amino-group containing polymers of the urea-formaldehyde type based on urea, melamine, guanidine and mixtures of these.

It is not known how, or even why, these nitrogeneous materials should function in the way they do, especially as some of them, for example tall oil, do not contain much nitrogen. Nevertheless their effect is to provide a homogeneous resin containing system, when the components thereof are blended. These resin mixtures with surfactant, blowing agent and nitrogenous modifier also have the peculiar property that they require an "aging" period before use. By this it is meant that after blending together the four materials making up the phenol-formaldehyde component it should be stored for a period of time before use to obtain a good uniform foam. The time required seems to depend upon a number of factors, and can be as low as 4 hours. At normal ambient temperatures of about 60° F./15° C. storage overnight appears to be sufficient. During storage, the component is preferably held in a sealed container, primarily to minimize loss of blowing agent.

When ready for use, the resin component is a homogeneous viscous liquid (unless dyes, fillers, etc. have been added to it).

The second component used in preparing our foams is the acid catalyst. This comprises a mixture of acids dispersed in a polyhydroxy compound. The polyhydroxy compound can be chosen from a wide range. Readily available ones are ethylene glycol, propylene glycol, and glycerine. We prefer to use propylene glycol, although other polymeric glycols are also suitable.

The phosphoric and boric acids are used as alternatives; whichever is used can be replaced at least in part by the organic acid. As organic acid, suitable are a sulphonic acid such as methane sulphonic acid, benzene sulphonic acid, or para-toluene sulphonic acid. No precise preferred catalyst can be given. The catalyst formulation used will be determined by the nature of the foam being made, for example a fast-forming foam, or a slow-forming foam.

The ratio of acid catalyst to glycol used is variable. How much glycol is used depends on the desired foam qualities, since the glycol will act as a plasticizer to soften the foam. But there must be present a minimum amount as otherwise it becomes exceedingly difficult to obtain adequate dispersion of the catalyst into the phenol-formaldehyde resin component. If the glycol is also being used as a plasticizer, at least some of the amount used can be incorporated into the resin component without detriment thereto, provided the required minimum is retained in the acid catalyst component.

The catalyst component is prepared by mixing or blending together the acids and the glycol, and allowing the mixture to cool, generally to provide a viscous oil. This viscous mixture has the added advantage that when the two components of the foam are mixed, a blend is obtained with better body and flow properties than many known phenol-formaldehyde resin foam systems. This is of considerable practical assistance in placing the material prior to its foaming.

Typical examples of the catalyst composition are:

CATALYST-1

100 parts by weight of conc. sulphuric acid
100 parts by weight of conc. phosphoric acid
100 parts by weight of propylene glycol

CATALYST-2

100 parts by weight of paratoluene sulphonic acid
100 parts by weight of conc. phosphoric acid
50 parts by weight of propylene glycol The acids are mixed first and placed in a cooling bath. Slowly, the glycol is added under constant agitation of the components. The resultant component mixture would be a somewhat viscous liquid. The Gardner-Holdt viscosity of the mixture was C-D.

The above mentioned typical catalyst formulation will be used in the preparation of the actual foams of the invention. These merely represent two convenient catalysts: many others are possible.

The following foams were prepared based upon the resins of examples (A), (B), (C), (D), (E) and (F);

| EXAMPLE RESINS: | A | B | C | D | E | B | B | B |
|---|---|---|---|---|---|---|---|---|
| Phenol-formaldehyde | 100 | 100 | 100 | 100 | 100 | 100 | 100 | 100 |
| Surfactant (Dow-190) | 2 | 2 | 2 | 2 | 2 | 2 | 2 | 2 |
| Triethanolamine | 2 | 2 | — | 2 | 2 | 2 | 2 | 2 |
| Example (F) | 10 | 10 | 10 | — | — | — | — | — |
| Reichhold's IB-013* | — | — | — | — | — | 10 | — | 5 |
| Reichhold's IB-603** | — | — | — | — | — | — | 10 | 5 |
| Dichlorodifluoromethane | 6 | 6 | 6 | 6 | 6 | 6 | 6 | 6 |
| Viscosity (cps.) | 850 | 940 | 900 | 750 | 800 | 1050 | 950 | 1000 |
| pH | 8.2 | 8.1 | 8.2 | 7.6 | 7.5 | 7.5 | 7.7 | 7.6 |

*a powdered urea/formaldehyde resin
**a powdered melamine/formaldehyde resin

| PROPERTIES OF THE ABOVE FOAM RESIN RESIN: CATALYST NO. 1, RATIO OF 2:1 | | | | | | | | |
|---|---|---|---|---|---|---|---|---|
| EXAMPLE RESINS: | A | B | C | D | E | B | B | B |
| Cream Time (sec.) | 10 | 15 | 12 | 14 | 8 | 15 | 9 | 13 |
| Rise Time (sec.) | 105 | 120 | 120 | 100 | 100 | 100 | 110 | 100 |
| Tack Free Time (sec) | Instantly After Rise Time | | | | | | | |
| Peak Exotherm °C. | 82 | 80 | 76 | 90 | 82 | 80 | 84 | 82 |
| Density lbs/cu.ft. | 2.0 | 2.2 | 1.9 | 2.1 | 2.4 | 2.8 | 2.9 | 2.8 |
| Compressive Strength psi - ASTM D-1621 | | | | | | | | |
| - Parallel to rise | 18 | 24 | 17 | 19 | 28 | 26 | 31 | 34 |
| - Perpendicular to rise | 16 | 20 | 14 | 16 | 21 | 20 | 27 | 26 |
| Tensile Strength psi - Parallel to rise ASTM D-1623 | — | 41.6 | — | — | — | — | — | — |
| Humid Aging ASTM D-2126 | | | | | | | | |
| Weight Change % | — | +38.4 | — | — | — | — | — | — |
| Volume Change % | — | +8.5 | — | — | — | — | — | — |
| Flammability ASTM D-1622 | | | | | | | | |
| - Self-extinguishing | — | Yes | — | — | — | — | — | — |
| - Burnt Extent inches | — | 1.6 | — | — | — | — | — | — |
| Heat Aging (% W.Loss) ASTM D-2126 | | | | | | | | |
| - 2 days @ 400° F. | — | −25.0 | — | — | — | — | — | — |
| - 2 days @ 350° F. | — | −22.52 | — | — | — | — | — | — |
| - 2 days @ 300° F. | — | −20.6 | — | — | — | — | — | — |
| - 2 days @ 250° F. | — | −17.3 | — | — | — | — | — | — |
| - 7 days @ 250° F. | — | −17.6 | — | — | — | — | — | — |
| K-factor, Btu in./ft.$^2$ °F., ASTM D-518 | — | 0.198 | — | — | — | — | — | — |

| PROPERTIES OF THE ABOVE FOAM RESIN RESIN: CATALYST NO. 2 RATIO OF 2:1 | | | | | | | | |
|---|---|---|---|---|---|---|---|---|
| EXAMPLE RESINS: | A | B | C | D | E | B | B | B |
| Cream Time (sec.) | 22 | 21 | 28 | 22 | 20 | 18 | 22 | 24 |
| Rise Time (sec.) | 110 | 200 | 205 | 200 | 170 | 230 | 206 | 186 |
| Tack Free Time (sec) | Instantly after Rise Time | | | | | | | |
| Peak Exotherm °C. | 67 | 64 | 60 | 70 | 68 | 62 | 65 | 66 |
| Density lbs/cu.ft. | 2.5 | 3.2 | 3.0 | 4.2 | 3.6 | 3.2 | 3.0 | 3.6 |
| Compressive Strength psi | | | | | | | | |
| - Parallel to rise | 38 | 39 | 42 | 36 | 39 | 38 | 32 | 38 |
| - Perpendicu- | | | | | | | | |

-continued

| PROPERTIES OF THE ABOVE FOAM RESIN RESIN: CATALYST NO. 2 RATIO OF 2:1 | | | | | | | | |
|---|---|---|---|---|---|---|---|---|
| EXAMPLE RESINS: | A | B | C | D | E | B | B | B |
| lar to rise | 26 | 31 | 32 | 28 | 32 | 30 | 28 | 22 |

| PHYSICAL PROPERTIES OF THE PHENOLIC FOAM (TESTED ON RESIN B) AND CATALYST NO. 2 | | |
|---|---|---|
| METHOD | PROPERTIES | RANGE |
| ASTM D-1622 | Density, lbs./ft.$^3$ | 2–4 |
| ASTM C-518 | K-Factor, Btu in./ft.$^2$, °F. | 0.2–0.25 |
| ASTM D-2126 | Dimensional Stability, 158° F./95% RH, % Volume Change (1–7 days) | 8.0–10.0 |
| ASTM D-1621 | Compressive Strength, p.s.i. | |
| | - Parallel to rise | 20–40 |
| | - Perpendicular to rise | 15–30 |
| ASTM D-1623 | Tensile Strength, p.s.i. | |
| | - Parallel to rise | 20–50 |
| ASTM D-2126 | Heat Aging % Weight Loss: | |
| | 2 days @ 400° F. | −15−−25 |
| | 2 days @ 350° F. | −10−−20 |
| | 2 days @ 300° F. | −10−−20 |
| | 2 days @ 250° F. | −10−−20 |
| | 7 days @ 250° F. | −10−−20 |
| ASTM D-1622 | Flammability - Self Extinguishing | Yes |
| | - Burnt Extent (inches) | 1.0–2.0 |

It was mentioned earlier that the choice of amine, or amine group containing, component is very wide. The amine component can be utilized to serve diverse requirements, in addition to its use to provide a homogeneous storage-stable phenol-formaldehyde resin component for the foam. Choice of amine material is based on the properties desired in the final foam, and its manner of placement.

In term of properties, these foams are generally used as thermal insulators, and therefore their burning properties are an important consideration in formulation. It is therefore not desirable to use an amine which is volatile in an insulating foam. Reference to the amines listed above will show that they are all essentially non-volatile. A volatile amine could be used where the attendant fire hazard is of no importance. It has also been found that the presence of these amino compounds in the foams has a marked "antipunking" effect, which, in terms of the properties of foam used as thermal insulators, is highly desirable.

The amine material can also be chosen to assist with foam placement. For a poured foam, for example, one pumped into a gap from the top, an amine such as triethanolamine is satisfactory. But phenol-formaldehyde resin foams do not generally cure very quickly at lower temperature and pH, and thus their application by spraying to surfaces such as walls and ceilings has been limited. This invention permits the use of amino resin material derived from urea, melamine or guanadine or mixtures thereof as the amino material. This polymer serves the dual function of providing both a stable, homogeneous resin system, and, on spraying, a rapidly curing skeleton which holds the phenol-formaldehyde resin in place for sufficient time to allow its slower curing processes to go on without requiring excessive acidity and heat.

In the example shown in the table, the usage of amino resins has been illustrated in combination with other amines and essentially phenol-formaldehyde resins.

"Punking" is a phenomenon associated with charring. It is the propagation of charring randomly through a material, often along a path of a limited cross sectional area. Thus, although the surface of a piece of foam may have ceased both to burn and to glow, plunking can still be going on inside the foam, which can give rise to the ignition of a flammable material in contact with the foam at a point remote from the source of heat.

A method of checking whether a foam punks or not was devised in our laboratory. A cube of foam having a four inch side was cut and a 2 inch × 2 inch round mouse hole was dug out on one face. A handheld propane flame was used to burn the hole to a glow for 2 minutes. The burnt piece was left on the bench and observed to see if the foam continued to burn through by itself. If no autogeneous burn-through occurred, the foam was declared as a "non-punking" foam. All of the above exemplified resins satisfied this test.

The amounts of the various components used in a foam according to this invention will be determined by the properties desired in the final foam after placement. Such a foam may also include any of the conventional dyes, fillers and so forth that may be required, for example for aesthetic reasons. These amounts of components can easily be decided by way of a few small scale experiments. Broadly, choice from within the following ranges of the various components will generally be found to provide an acceptable placed foam.

| Resin Component | |
|---|---|
| Resin | 100 parts by weight |
| Surfactant: | 0.1 to 0.4 parts by weight |
| Amino material: | 1 to 20 parts by weight |
| Preferred Amino material range: | 4 to 10 parts by weight |
| Blowing agent*: | 1 to 20 parts by weight |
| Polyhydroxy compound**: | 0 to 25 parts by weight |

*The amount used is largely determined by the desired foam density plus some allowance for handling losses, etc.
**See earlier discussion concerning incorporation of this into the resin component excluding any addition of boric and phosphoric acids.

Ratio of Resin to Catalyst

This ratio is determined by the acid requirements of the resin needed in order to obtain an acceptable degree of cross linking. Thus generally a weight ratio of resin to catalyst in the range of from about 4:1 to 1:1 could be found suitable but these limits are not precise.

Thus in deciding upon the precise values of the various variable parameters involved in preparing foams according to this invention the major determining factor is ensuring that the foam when placed has the properties desired of it.

Some further examples of foams are as follows.

EXAMPLE 1

| | Resin Component | |
|---|---|---|
| A. | Resole phenol-formaldehyde resin: | 200 parts |
| B. | Dow Corning Silicone 190 surfactant: | 4 parts |
| C. | Ethylene glycol | 50 parts |
| D. | Hexamethylene tetramine | 5 parts |
| E. | Urea/formaldehyde resin powder | 5 parts |
| F. | Dichlorodifluoromethane (Freon 11) | 20 parts |
| | Catalyst Component | |
| | Sulphuric acid (technical grade, concentrated) | 100 parts |
| | Phosphoric acid (85%, technical grade) | 100 parts |
| | Propylene glycol | 100 parts |

Procedure

Components A to E of the resin were blended sequentially in the order given, and mixed until clear. The mix was cooled to about 20° C., and the blowing agent added. The vessel was then sealed and held under autogenous pressure with cooling for 24 hours.

Foam Preparation

Resin and catalyst components mixed in equal parts by weight; foam density was 0.04 gm/c. c. approx.

The resin A used in this example is a zinc acetate catalysed material produced according to the procedures in Canadian Patent 927,041, with a phenol/formaldehyde ratio of 1:1.39.

EXAMPLE 2

| | Resin Component | |
|---|---|---|
| A. | Resole phenol-formaldehyde resin | 200 parts |
| B. | Dow Corning Silicone 190 surfactant | 4 parts |
| C. | Hexamethylene tetramine | 15 parts |
| D. | Dichlorodifluoromethane | 10 parts |
| | Catalyst Component | |
| | Sulphuric acid (technical grade, concentrated) | 125 parts |
| | Phosphoric acid (85%, technical grade) | 125 parts |
| | Propylene glycol | 100 parts |

Procedure and Foam Preparation were as in Example 1. The resole resin used is also the same. Foam density: 0.04 gm/c. c. approx.

EXAMPLE 3

| | Resin Component | |
|---|---|---|
| A. | Resole phenol-formaldehyde resin | 500 parts |
| B. | Dow Corning Surfactant 190 | 16 parts |
| C. | Hexamethylene tetramine | 10 parts |
| D. | Urea/formaldehyde resin powder | 20 parts |
| E. | Paratoluene sulphonic acid | 0.8 parts |
| F. | Dichlorodifluoromethane | 80 parts |
| | Catalyst Component | |
| | Sulphuric acid (technical grade, concentrated) | 300 parts |
| | Phosphoric acid (85%, technical grade) | 300 parts |
| | Propylene glycol | 300 parts |

Procedure and Foam Preparation were as in Example 1. The resole resin used is also the same as that in Example 1. Foam density: 0.04 gm/c. c. approx.

What is claimed is:

1. A method of making a phenol-formaldehyde resin foam which comprises:
   (A) preparing a phenol-formaldehyde resin component by first mixing a phenol-formaldehyde resin with a surfactant, a nitrogenous modifier capable of permitting dispersion of a blowing agent in the resin, and a blowing agent; the surfactant, modifier, and blowing agent being added sequentially, and in the order given, to the resin, the completed mix then being aged before use;
   (B) preparing a catalyst component by mixing together equal weights of a liquid polyhydroxy compound and an acid catalyst system; and
   (C) optionally after a period of storage, mixing together the components prepared in (A) and (B) in the desired ratio to provide a phenol-formaldehyde resin foam.

2. A method according to claim 1 which comprises:
   (A) preparing a phenol-formaldehyde resin component by first mixing a resole phenol formaldehyde resin, having a water content of up to 20% and a pH of between 4.0 and 6.0 and which resin was prepared under acid conditions, with a surfactant, a nitrogenous modifier chosen from an amine, or a polymeric amine, or a natural vegetable oil containing amine or amino nitrogen, and a blowing agent chosen from a hydrocarbon or a chloro fluorohydrocarbon; the surfactant, modifier, and blowing agent being added sequentially and in the order given, to the resin; the completed mix then being aged before use;
   (B) preparing a catalyst by mixing together sulphuric acid, or an organic sulphonic acid together with one or more acids chosen from boric acid, or phosphoric acid, and a polyhydroxy compound chosen from ethylene glycol, propylene glycol and glycerin, in a weight ratio of acid catalyst to polyhydroxy compound of at least 1:1, excluding any boric acid and/or phosphoric acid additions; and
   (C) optionally after a period of storage, mixing together the components prepared in (A) and (B) in the desired ratio to provide a phenol-formaldehyde resin foam.

3. A method according to claims 1 or 2 wherein the resin component (A) also contains a polyhydroxy compound.

4. A method according to claims 1 or 2 wherein the resin has a pH of from 4.5 to 6.0.

5. A method according to claims 1 or 2 wherein the blowing agent is dichlorodifluoromethane.

6. A method according to claims 1 or 2 wherein the surfactant is a silicone based material.

7. A method according to claims 1 or 2 wherein the catalyst component (B) includes an organic acid chosen from methane sulphonic acid, benzene sulphonic acid, and para toluene sulphonic acid.

8. A method according to claims 1 or 2 wherein the nitrogenous modifier is chosen from at least one of diethanolamine, triethanolamine, diethanol triamine, triethanol tetramine, piperazine, hexamethylene tetramine, and amino group containing polymers of formaldehyde with urea, melamine or guanidine.

9. A method according to claims 1 or 2 wherein the catalyst component (B) contains 1 part by weight sulphuric acid or organic sulphonic acid, together with zero to 1 part by weight phosphoric acid, provided that the weight ratio of other acids to sulphuric acid does not exceed 1:1.

10. A method according to claims 1 or 2 wherein the resin component (A) contains by weight:
    Phenol-formaldehyde resin: 100 parts
    Surfactant: 0.1 to 4.0 parts
    Nitrogenous modifier: 1 to 20 parts, and
    Blowing agent: 1 to 20 parts.

11. A method according to claims 1 or 2 wherein the catalyst component (B) comprises 1 part by weight sulphuric acid, 1 part by weight 85% phosphoric acid, and from 0.5 to 1.0 parts by weight propylene glycol.

12. A method according to claims 1 or 2 wherein in component (A) the phenol-formaldehyde resin used has been prepared from substantially pure phenol.

13. A method according to claims 1 or 2 wherein in component (A) the phenol-formaldehyde resin has been prepared from technical grade phenol.

14. A method according to claims 1 or 2 wherein in component (A) the phenol-formaldehyde resin has been prepared from a technical phenol having a boiling range of 180° to 200° C. and containing not more than 15% by weight of ortho-cresol plus xylenols.

15. A method according to claims 1 or 2 wherein in step (A) a polyhydroxy compound is also included in the resin phenol-formaldehyde resin component, which polyhydroxy compound may be different to that used in preparing the catalyst component in step (B).

16. A foamable composition comprising in admixture a first component and a second component, said first component comprising a phenol-formaldehyde resin, a blowing agent which is an inert, low boiling liquid, an effective amount of a nitrogenous modifier capable of permitting dispersion of the blowing agent in the resin, and a surfactant, and said second component comprising an acid catalyst dispersed in a liquid polyhydroxy compound, in a weight ratio of acid catalyst to polyhydroxy compound of at least 1:1.

17. A foamable composition according to claim 16 comprising in admixture a first component and a second component, said first component comprising:
 (a) a resole phenol-formaldehyde resin with a water content of up to 20%, which has been prepared under acid conditions, and has a pH of between 4.0 and 6.0;
 (b) an inert blowing agent chosen from a hydrocarbon or a chlorofluorohydrocarbon;
 (c) a surfactant;
 (d) a nitrogeneous modifier chosen from an amine, or a polymeric amine, or a natural vegetable oil containing amine or amino nitrogen; and said second component comprising:
  (i) an acid catalyst system containing sulphuric acid, or an organic sulphonic acid, together with phosphoric acid,
  (ii) said acid (i) being dispersed in a polyhydroxy compound chosen from ethylene glycol, propylene glycol, and glycerine, in a weight ratio of acid catalyst to polyhydroxy compound of at least 1:1, excluding any addition of phosphoric acid.

18. A foamable composition according to claims 16 or 17 wherein the phenol-formaldehyde resin has a pH of from 4.5 to 6.0.

19. A foamable composition according to claims 16 or 17 wherein the blowing agent is dichlorodifluoromethane.

20. A foamable composition 16 or 17 wherein the surfactant is a silicone-based material.

21. A foamable composition 16 or 17 wherein the second component includes an organic acid chosen from methane sulphonic acid, benzene sulphonic acid, and para-toluene sulphonic acid.

22. A foamable composition according to claims 16 or 17 wherein the nitrogenous modifier is chosen from at least one of diethanolamine; triethanol amine, diethanoltriamine; triethanoltetramine; piperazine; hexamethylene tetramine, amino group containing urea-formaldehyde polymers based on urea, melamine, and guanidine.

23. A foamable composition according to claims 16 or 17 wherein the acid catalyst contains 1 part by weight sulphuric acid or organic sulphonic acid, together with zero to 1 part by weight phosphoric acid, and zero to one part by weight boric acid, provided that the weight ratio of other acids to sulphuric acid or organic sulphonic acid does not exceed 1:1.

24. A foamable composition according to claims 16 or 17 wherein the first component contains by weight:
Phenol-formaldehyde resin: 100 parts
Surfactant: 0.1 to 4.0 parts
Nitrogenous modifier: 1 to 20 parts, and
Blowing agent: 1 to 20 parts.

25. A foamable composition according to claims 16 or 17 wherein the second component comprises 1 part sulphuric acid, 1 part 85% phosphoric acid, and at least 0.5 part propylene glycol, in each case by weight.

26. A foamable composition according to claims 16 or 17 wherein the phenolformaldehyde resin used has been prepared from substantially pure phenol.

27. A foamable composition according to claims 16 or 17 wherein the phenolformaldehyde resin has been prepared from technical grade phenol.

28. A foamable composition according to claims 16 or 17 wherein the phenolformaldehyde resin has been prepared from a technical phenol having a boiling range of 180° to 200° C. and containing not more than 15% by weight of orthocresol plus xylenols.

29. A foamable composition according to claims 16 or 17 wherein the first component additionally contains a polyhydroxy compound which may be different to that in the second component.

* * * * *